June 13, 1933.  P. C. RICCHIARDI  1,914,043
RADIO TELEGRAPHIC AND TELEGRAPHIC RECEIVING SYSTEM
Filed March 26, 1931
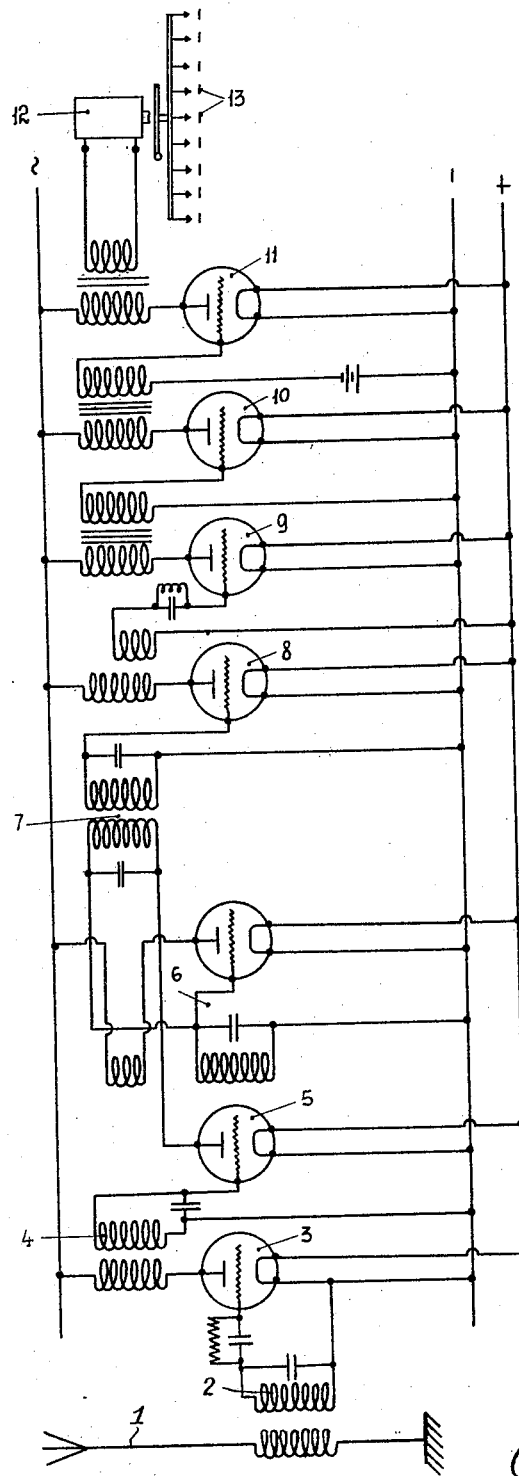
Inventor,
Pier C. Ricchiardi,
By Henry Orth Jr Patented June 13, 1933

1,914,043

UNITED STATES PATENT OFFICE

PIER CARLO RICCHIARDI, OF TURIN, ITALY, ASSIGNOR TO S. A. BREVETTI ITALIANI ESTERI S. A. B. I. E., OF TURIN, ITALY, A JOINT-STOCK COMPANY OF ITALY

RADIO TELEGRAPHIC AND TELEGRAPHIC RECEIVING SYSTEM

Application filed March 26, 1931, Serial No. 525,541, and in Italy March 31, 1930.

This invention relates to wireless telephony, telegraphy or control systems, employing tuned electro-mechanical relays which are excited by an incoming wave of a determined frequency, and control, directly or through suitable relays, local telephonic or control circuits, the object of this invention being more particularly to improve said tuned electro-mechanical relays, whereby an accurate tuning, a satisfactory amplification without losses of energy and therefore a perfect resonance with the vibrating reed controlling the telephonic or control circuit are obtained, and, above all, in the case of transmission from a central station to a large number of receiving stations, perfectly equal sets of vibrating reeds or tuned mechanical relays can be employed by all the said receiving stations. This arrangement obviously improves the accuracy of tuning and simplifies the construction of the receiving sets, since only a small number of reeds need be calibrated.

The electrical tuned relay according to this invention has the characteristic feature that transmission is effected by modulation of a high-frequency carrier wave, and the modulated wave, after having been rectified, beats with the wave generated by a heterodyne connected between the receiving circuit and the amplifying stages at low frequency so as to obtain low-frequency beats which are rectified and amplified and thereupon act on a vibrating reed calibrated for coming into resonance with said beat frequency.

By this arrangement it will be sufficient to vary the modulating frequency of the carrier wave and that of the local heterodyne so that the difference between both frequencies is equal to the resonance frequency of the vibrating reed, in order to obtain a wide range of combinations while maintaining the features of the mechanical resonators or reeds constant in all the receiving apparatus.

The accompanying drawing shows by way of example a constructional form of an electro-mechanical tuned relay according to this invention.

Referring to the drawing, 1 denotes the aerial, 2 the oscillating receiving circuit connected with the grid circuit of the three-electrode tube 3, where the modulated incoming wave is filtered and rectified, the said wave being successively transmitted through an intermediate frequency transformer 4 to the amplification tube 5 coupled with the heterodyne 6.

The heterodyne 6 produces a frequency which, coupled with the frequency received by the tube 5, gives rise to low-frequency beats in resonance with one of the vibrating reeds 13. These beats flow through the transformer 7 to the amplifier 8, are rectified in the electron tube 9, amplified in the low-frequency stages 10 and 11 and are thereupon caused to act on the circuit of a relay 12 setting into vibration the vibrating reed which is in resonance with the in-coming beat frequency.

It is clear that there will be as many vibrating reeds as there are modulation frequencies of the arriving carrier wave. The transmitting station should be in a condition to modulate the carrier wave so as to obtain at the receiving station beat frequencies corresponding to the resonance vibrations of the vibrating reeds 13. It will be evident that the vibrating reeds 13 of all the receiving apparatus can be made identical, as a receiving station can be distinguished from any other by the constant frequency generated by the heterodyne 6. The transmitting station shall not send out frequencies corresponding to those of the mechanical resonators or vibrating reeds 13. On the contrary, it will transmit other intermediate frequencies of which the period is determined in such manner that the difference between said frequencies and that of the heterodyne 6 is always equal to the resonating frequency of the corresponding vibrating reeds.

The set of the apparatus constituting the improved filter according to this application can be varied according to practical requirements without departing from the spirit of this invention.

What I claim is:

1. A radio-telegraphic and telegraphic receiving system comprising in combination with an oscillating receiving circuit capable of receiving a high-frequency carrier wave modulated to different intermediate frequencies, means for rectifying and isolating said modulation intermediate frequencies, a local oscillator capable of generating a predetermined frequency interfering with said intermediate frequencies for obtaining predetermined low frequencies, an amplifier for said low frequencies and a plurality of vibrating reeds selectively responsive to said predetermined low frequencies and adapted to control energizing circuits.

2. A radio-telegraphic and telegraphic receiving system comprising in combination with an oscillating circuit capable of receiving a high-frequency carrier wave modulated to different intermediate frequencies, means for rectifying and isolating said modulation intermediate frequencies, a heterodyne circuit capable of generating a predetermined local frequency interfering with said intermediate frequencies for producing predetermined low frequencies, an amplifier for said low frequencies and a plurality of vibrating reeds responding to said predetermined low frequencies and adapted to control energizing circuits.

3. A radio-telegraphic and telegraphic receiving system comprising in combination with an antenna and an oscillating circuit capable of receiving a high-frequency carrier wave modulated by groups of different intermediate frequencies, means for rectifying and isolating said modulation intermediate frequencies, an amplifying circuit for amplifying said groups of intermediate frequencies, a heterodyne circuit capable of generating a local frequency for interfering with said intermediate frequencies for generating low frequencies, an amplifying circuit for amplifying said low frequencies and a plurality of vibrating reeds responding to said low frequencies and adapted to control energizing circuits.

4. A radio-telegraphic and telegraphic receiving system comprising in combination with an oscillating receiving circuit tuned to a modulated high-frequency carrier wave, means for rectifying and isolating said modulation frequencies, a local oscillator capable of generating a frequency interfering with said modulation frequencies for obtaining low frequencies, a plurality of resonators and means associated with said local oscillator for causing said resonators to respond to the respective low frequencies.

In testimony that I claim the foregoing as my invention, I have signed my name.

PIER CARLO RICCHIARDI.